United States Patent Office 2,868,813
Patented Jan. 13, 1959

---

2,868,813

PROCESS FOR ESTER PRODUCTION BY CARBONYLATION

Robert Y. Heisler, Fishkill, N. Y., assignor to The Texas Company, New York, N. Y., a corporation of Delaware No Drawing. Application September 17, 1954
Serial No. 456,865

12 Claims. (Cl. 260—410.9)

This invention relates to an improvement in producing esters by the process of carbonylation, and more particularly to such process wherein a reaction mixture containing an olefinic compound is subjected to catalytic carbonylation with carbon monoxide and an alcohol.

Heretofore, it has been proposed to condense an olefinic compound with carbon monoxide and an alcohol in the presence of a catalyst containing metal of the iron subgroup of the periodic table, i. e., iron, nickel or cobalt. Conversion of reactants to the desired ester in such process is low, particularly when the olefin used is a higher olefin, e. g. the reaction of octylene-1 with carbon monoxide and methanol in the presence of about 0.55 weight percent cobalt carbonyl at about 5000 p. s. i. g. and 400° F. yields only about 6% of methyl pelargonate.

It has also been proposed to prepare esters by reacting together in the presence of a cobalt catalyst an olefinic reactant, carbon monoxide, hydrogen, and an organic carboxylic acid according to the general equation:

(1)

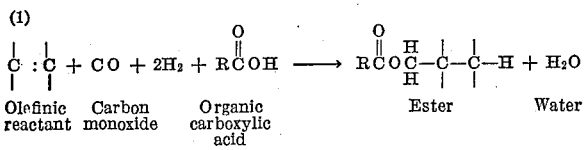

| Olefinic reactant | Carbon monoxide | Organic carboxylic acid | | Ester | | Water | where: R is an organic radical. In such process the acid moiety of the ester product is derived from the acid reactant charged.

To increase the yield of ester it has also been proposed to use a three-step process wherein an aldehyde is made by carbonylating an olefinic compound with carbon monoxide and hydrogen, said aldehyde is converted to an acid by air blowing, and the acid is esterified with the desired alcohol. This process is circuitous, and, furthermore, it is not especially efficacious for production of esters from acids containing a large number of carbon atoms, e. g. 8 or more.

I have now discovered that addition of at least one substance selected from the group consisting of organic compounds having $pK_{a_1}$ between 3 and 10, esters thereof, and salts thereof with organic bases (hereinafter referred to as promoters) to a reaction mixture of an olefinic compound and an alcohol increases the yield of ester as much as eight times over that obtainable from the same reactants when the promoter compound is not present and the mixture is carbonylated catalytically with carbon monoxide.

Formation of the ester by the process of my invention proceeds according to the following general equation:

(2)

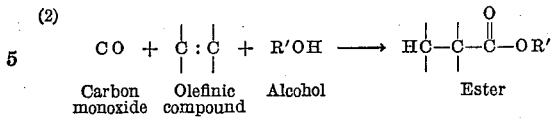

| Carbon monoxide | Olefinic compound | Alcohol | | Ester | where: R' stands for an organic radical. The acid moiety of the ester product in this reaction is derived from the olefinic and carbon monoxide reactants.

Advantages of my process include its simplicity and versatility for manufacture of a wide variety of esters.

Among the promoters suitable for use in my process are many weakly acidically-reacting carboxylic acids, phenols, thiols, thioacids, and analogous selenium and tellurium compounds. The acid strength of such a promoter as measured by the negative logarithm of its acid dissociation constant at 25° C., i. e. $pK_{a_1}$, should be between 3 and 10. In the case of a polybasic acid promoter, or other weakly acidic promoter exibiting a plurality of acidic hydrogen effects the criterion is the negative logarithm of the first acid dissociation constant only; in the case of a monobasic acid promoter or other weakly acidic promoter exhibiting but one acidic hydrogen effect the criterion is the negative logarithm of the sole acid dissociation constant. Esters of suitable promoter acids are also suitable as promoters by themselves or in mixtures with other promoters. Preferably such esters are of the same alcohol as is employed in the carbonylation reaction. Salts of the promoter compounds, e. g. acids and phenols, with organic bases such as primary, secondary, and tertiary amines e. g. pyridine, phenylamine, diethylamine and the like, are also suitable as promoters by themselves or in mixtures with other promoters.

The quantity of the promoter compound used in the reaction need only comprise a minor fraction of the reaction mixture to obtain dramatic improvement in ester yield. The promoter can be effective in concentrations below 1 weight percent of the reaction mixture, but can be used also in concentrations approaching as much as 50 weight percent if desired. Preferably the quantity of promoter used is from about 1 to about 5 weight percent of the reaction mixture for efficiency and economy in the practice of the process.

Promoters which I have found to be especially efficacious for ester formation are benzoic acid ($pK_a=4.20$) para-amino benzoic acid ($pK_a=4.92$), and amino benzoate esters. The following compilation, while by no means exhaustive, shows typical acids suitable for use as promoters in my process: m-toluic, p-toluic, p-chlorobenzoic, m-hydroxy benzoic, anisic, anthranylic, acetic, phenylacetic, nicotinic, sulfanilic, hydrocinnamic, isophthalic, n-valeric, trimethylacetic beta-chloropropionic, succinic, glutaric, adipic, pimelic, suberic, azelaic, and sebacic. Phenol and substituted phenols such as o-cresol, p-cresol, o-chlorophenol, p-aminophenol, 2,4,6-trichlorophenol, p-nitrophenol, carvacrol, pyrogallol, and catechol, substituted thiols, thioacids, and selenium and tellurium compounds analogous to these various oxygen- and sulfur-containing compounds are also among the conceivable promoters for practice of my process, provided their acid strength, as measured by their $pK_a$ at 25° C., is between 3 and 10. Similarly, mixtures of water and acid anhydrides reacting to form the suitably weak acids under conditions of the carbonylation, and mixtures of water and lactones reacting to form acidically-reacting promoters under conditions of the carbonylation are also among the conceivable promoters for practice of my process.

The organic compounds containing olefinic saturation which may be used in accordance with this invention are the olefinic hydrocarbons and other organic compounds containing at least one non-benzenoid double bond between carbon atoms. Examples of such compounds are the olefinic hydrocarbons themselves, such as ethylene, propylene, the butylenes, the pentenes, the hexenes, cyclohexene, cracked petroleum fractions, polymerized dienes, and pinene (the preferred olefinic compounds for efficiency and economy in the practice of the process being monoolefin hydrocarbons having 2 to 20 carbon atoms); unsaturated oxygenated compounds such as esters of cyclohexene carboxylic acids; and, in general, the unsaturated hydrocarbons, acids, esters, ethers, alcohols, nitriles, amides, and ketones containing non-benzenoid olefinic unsaturation. Vinyl, acrylic, and unsaturated aldehydic compounds which tend to polymerize readily under reaction conditions are less desirable starting materials because of this tendency.

Advantageously the alcohol used in the carbonylation process is a lower alkanol, i. e. an alkanol having 1 to 8 carbon atoms and especially, for ease of ester formation, a lower primary alkanol containing 1 to 3 carbon atoms. Reactivity of the alcohols for use in my process descends in the following order: primary alcohols, secondary alcohols, tertiary alcohols.

The preferred carbonylation catalyst is one containing cobalt. While in some cases it suffices to add to the reaction mixture a cobalt compound convertible to cobalt tetracarbonyl and/or hydrocarbonyl under conditions of the carbonylation, e. g. cobalt carbonate, I prefer to use cobalt carbonyl itself in concentration of about 0.1 to 2.0 weight percent based upon the weight of the reaction mixture exclusive of promoter compound.

Inert liquid diluents such as toluene can be used in the reaction if desired, but they are not necessary. The carbon monoxide used in the reaction is preferably of high purity, but it also can be diluted with inert gases such as nitrogen or argon. Proportion of alcohol to olefin reactant in my process is generally in the range from 1½ to 10 mols alcohol per mol of olefin and is preferably between about 2 and about 5 mols of alcohol per mol of olefin to obtain the best ester yields.

Elevated pressures are advantageous in the reaction, e. g. above 1000 p. s. i. g. Preferably the pressure employed is from about 3000 to about 9000 p. s. i. g., especially from 3000 to 5000 p. s. i. g. Temperature should be at least 250° F. to obtain substantial reaction rate. Preferred operating temperatures are between 300 and 500° F., especially about 400° F.

For the manufacture of small quantities of the desired esters batch carbonylation appears to be the most economical; but when demand warrants it, continuous or semi-continuous techniques on the order of those proposed for aldehyde production from olefins, carbon monoxide and hydrogen can be adapted for use in my process.

Suitable materials of construction for the carbonylation reactor are glass-lined steel, silver-lined steel, or a high alloy stainless steel such as American Iron Steel Institute Standard Type No. 410.

The following detailed description shows several ways in which my invention has been practiced employing a number of representative promoters but is not to be construed as limiting the invention.

The carbonylation procedure adopted for a series of test runs was as follows: a mixture of 1½ gram mols of octylene-1, 250 ml. of alcohol, 4 grams cobalt carbonyl and a promoter compound was subjected to 3000 p. s. i. g. pressure with 99.9% pure carbon monoxide in a 1535 milliliter, A. I. S. I. Standard Type No. 410 stainless steel-lined, agitated reactor. Temperature was raised to and maintained at about 400° F. The average pressure developed during a run was between 4500–5500 p. s. i. g. When absorption of carbon monoxide virtually had ceased the reactor was cooled to room temperature and vented to atmosphere. Reactor contents were then heated to 250° F. to decompose the cobalt catalyst. The reactor contents were filtered and subjected to fractional distillation to separate the pelargonate ester from the reaction mixture. Pertinent data from the runs is compiled in Table I.

Table I

| Run No. | 1 | 2 | 3 | 4 |
|---|---|---|---|---|
| Hours | 9½ | 7¾ | 8¾ | 13¾. |
| Alcohol | Methanol | Ethanol | Methanol | Methanol. |
| Promoter | p-amino-benzoic acid. | ethyl p-amino benzoate. | p-amino benzoic acid. | benzoic acid. |
| wt. percent of charge | 32.8 | 32.9 | 0.9 | 0.9. |
| Av. Pressure, p. s. i. g | 4,721 | 4,525 | 5,145 | 5,410. |
| Av. Temp., ° F | 406 | 402 | 400 | 399. |
| Pelargonate Ester Separated | Methyl | Ethyl | Methyl | Methyl. |
| Yield: | | | | |
| Percent of olefin charged | 52.6 | 36.9 | 28.8 | 13.2. |
| Percent of olefin consumed | 52.6 | 36.9 | 36.7 | 20.6. |

Obviously many modifications and variations of the invention as hereinbefore set forth may be made without departing from the spirit and scope of the invention and therefore only such limitations may be imposed as are indicated in the appended claims.

I claim:

1. In a process for forming a lower alkyl ester of a carboxylic acid having $n+1$ carbon atoms by reacting a monoolefinic aliphatic hydrocarbon of $n$ carbon atoms, $n$ being an integer between 2 and 20, with carbon monoxide and a lower alkanol in the presence of cobalt carbonylation catalyst at a pressure above 1000 p. s. i. g. and temperature of 250–500° F., the improvement which comprises forming said reaction mixture with an organic substance having $pK_a$ between 3 and 10 selected from the group consisting of carboxylic acids having a benzenoid nucleus and lower alkyl esters thereof, the amount of said organic substance being a minor fraction of said reaction mixture.

2. The process of claim 1 wherein said organic substance is benzoic acid.

3. The process of claim 1 wherein said organic substance is p-amino benzoic acid.

4. The process of claim 1 wherein said organic substance is a p-amino benzoate ester of the alcohol employed in the carbonylation reaction.

5. The process of claim 1 wherein the alkanol contains from one to three carbon atoms.

6. The process of claim 5 wherein the alkanol is methanol.

7. The process of claim 5 wherein the alkanol is ethanol.

8. Process of claim 1 wherein the olefin used has between 8 and 20 carbon atoms.

9. The process for making a pelargonic ester which comprises forming a reaction mixture of octylene-1, a lower alkanol, and a minor portion of an organic substance having $pK_a$ between 3 and 10 selected from the group consisting of carboxylic acids having a benzenoid nucleus and lower alkyl esters thereof, and reacting said mixture with carbon monoxide at a pressure above 1000 p. s. i. g. and a temperature of 250–500° F. in the presence of cobalt carbonylation catalyst.

10. The process of claim 9 wherein the lower alkanol is methanol, said organic substance is p-aminobenzoic acid, and the product is methyl pelargonate.

11. The process of claim 9 wherein the lower alkanol is methanol, said organic substance is benzoic acid, and the product is methyl pelargonate.

12. The process of claim 9 wherein said lower alkanol is ethanol, said substance is ethyl p-aminobenzoate, and the product is ethyl pelargonate.

References Cited in the file of this patent

UNITED STATES PATENTS

| | | |
|---|---|---|
| 1,924,762 | Woodhouse | Aug. 29, 1933 |
| 2,542,767 | Gresham et al. | Feb. 20, 1951 |
| 2,549,455 | Gresham et al. | Apr. 17, 1951 |
| 2,739,169 | Hagemeyer | Mar. 20, 1956 |
| 2,768,968 | Reppe | Oct. 30, 1956 |